Patented Jan. 1, 1935

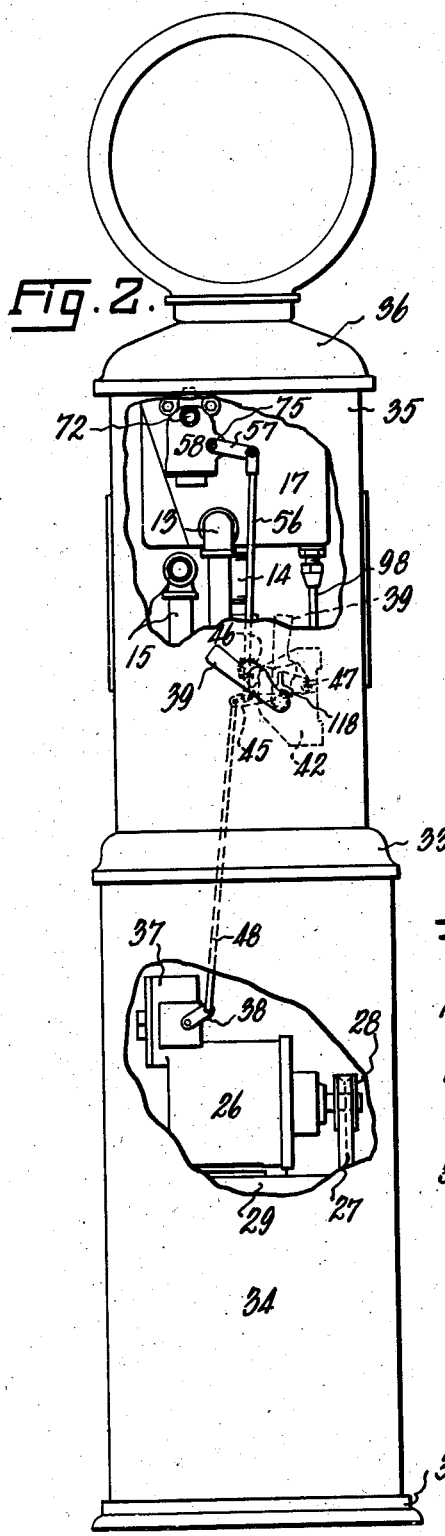
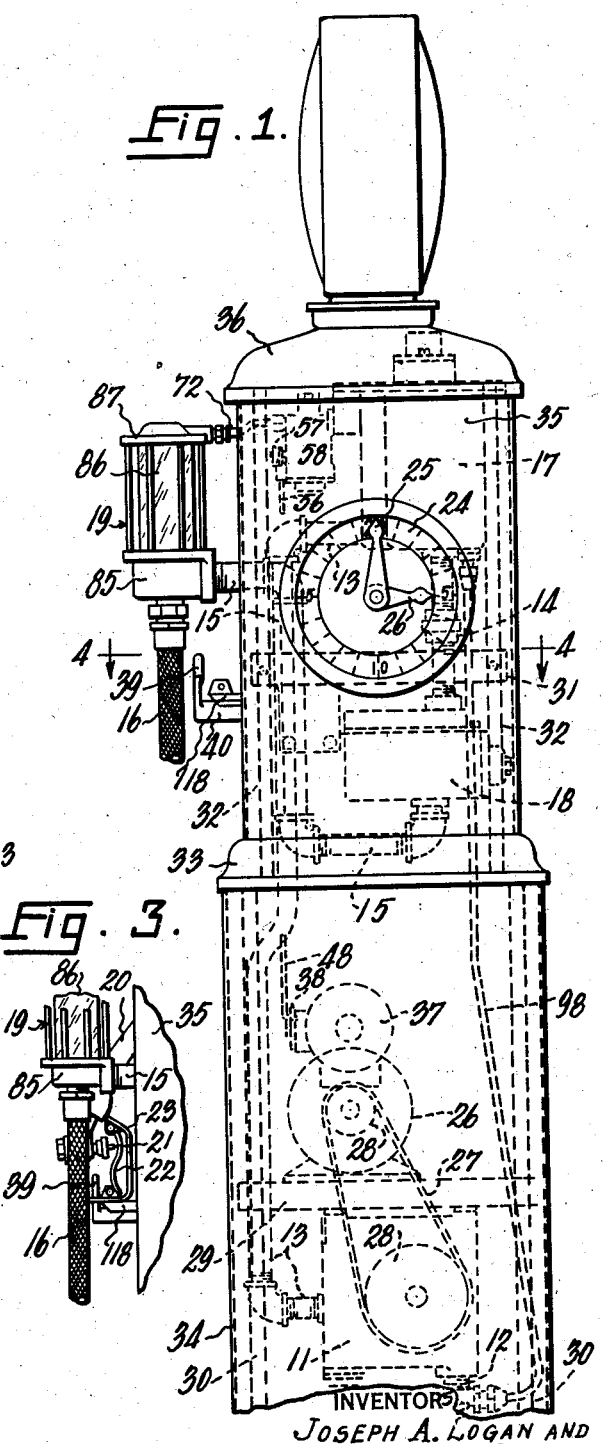

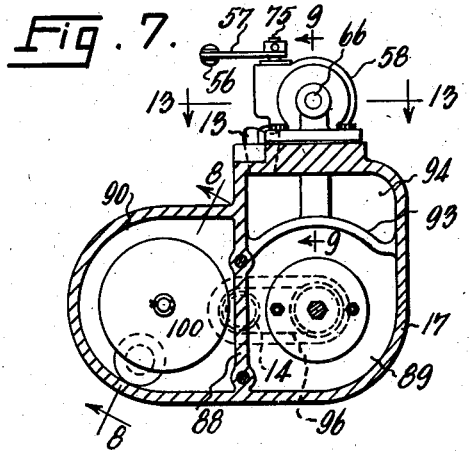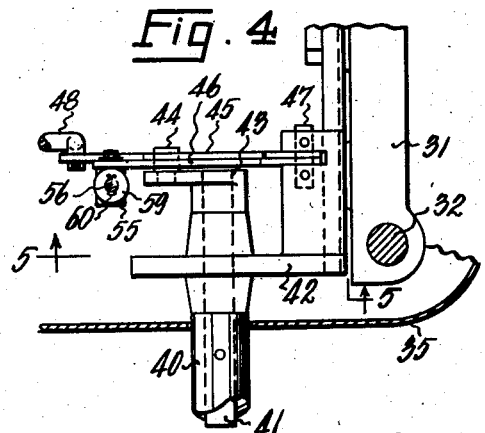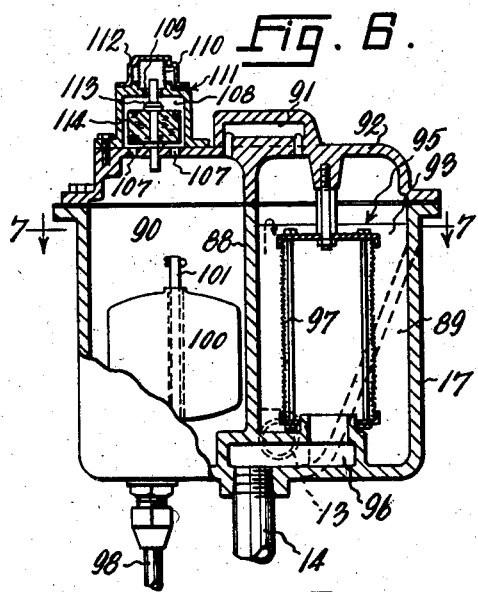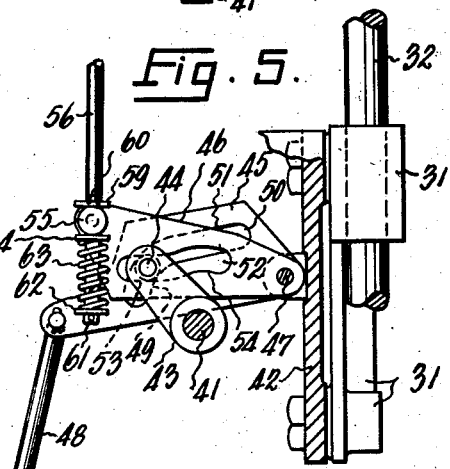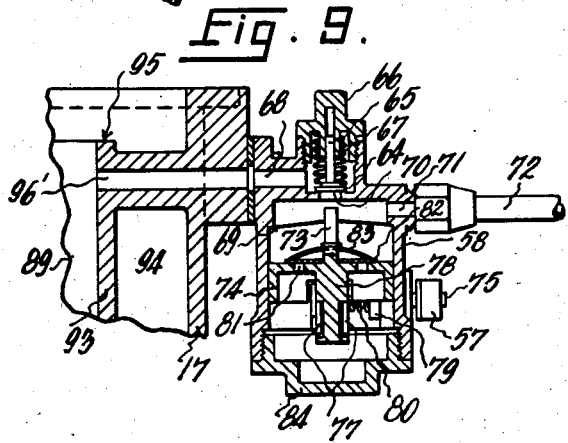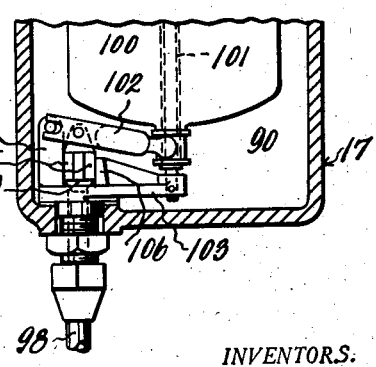

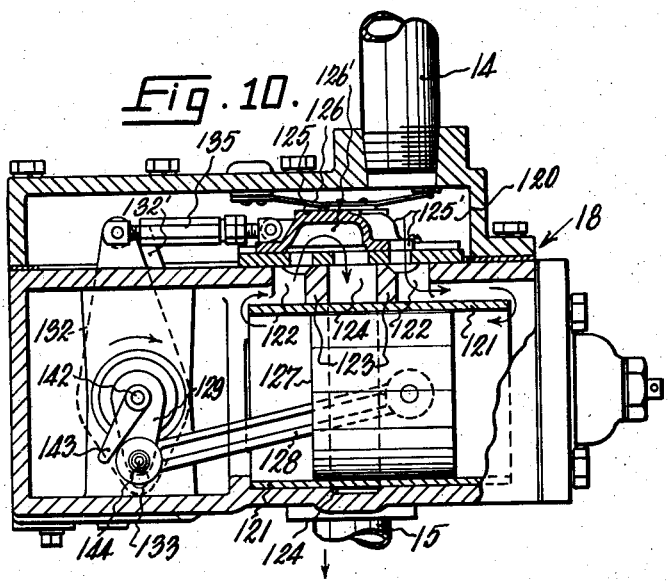

1,985,935

UNITED STATES PATENT OFFICE 1,985,935

LIQUID DISPENSING APPARATUS

Joseph A. Logan and Warren H. De Lancey, Springfield, Mass., assignors to Gilbert & Barker Manufacturing Company, West Springfield, Mass., a corporation of Massachusetts Application February 10, 1934, Serial No. 710,684

13 Claims. (Cl. 221—95)

This invention relates to improvements in liquid dispensing apparatus, such for example as that used for dispensing measured quantities of gasoline and the like.

This application is a continuation in part of our U. S. patent application Serial No. 682,772, filed July 29, 1933.

The now prevalent form of gasoline dispensing apparatus includes a suitable means, such for example as an electrically operated pump, for lifting gasoline from an underground storage tank and forcing it through a delivery conduit, which includes as a terminal portion a flexible hose, into the tank of the customer's car. Any suitable type of meter is interposed in the delivery conduit to measure the quantities of liquor dispensed. Interposed in the delivery conduit, usually at the inlet end of the flexible hose, is a so-called visible discharge indicator comprising essentially a casing having a transparent wall through which the liquid may be observed. This indicator is usually required to be located above the meter and it is supposed to be full of liquid at all times to show that the meter and the entire delivery conduit, including the hose, are filled with liquid. It is usual to equip the apparatus with an air separator, designed to rid the gasoline of entrapped air and gases prior to entry of the gasoline into the meter. Despite this precaution, however, air sometimes collects in the upper part of the visible discharge indicator during idle periods of the apparatus and, when the pump is again started, the accumulated air is immediately compressed resulting in a sudden jumping ahead of the pointer of the register driven by the meter, giving a false indication that liquid has been delivered at a time before the delivery of liquid has commenced. Devices have been proposed to rid the indicator of air by diverting it into the hose but there is the difficulty here that the air which enters the hose in the form of small bubbles, does not always pass out of the hose. The hose usually comprises as an inner part thereof, a spirally wound metal strip which presents a continuous spiral groove in which the air bubbles can lodge. Later, when the pump is stopped, these bubbles gradually work their way upwardly into the discharge indicator and cause the difficulty above described.

There is another source which is effective to cause the same trouble of a false indication by the pointer of the register, even under the condition where the visible discharge indicator is maintained full of gasoline. This source of trouble is the flexible hose which, due to its construction, can and does stretch when filled with gasoline under pressure. For example, the pump is started up prior to the opening of the valve in the hose nozzle and a substantial pressure is built up,—say 18 lbs. per square inch. The liquid under this pressure pushes on the closed nozzle valve located at one end of the hose, while the other end of the hose is fixed. The result is a stretching of the hose and as it elongates it holds more gasoline, wherefore the pointer of the register will show the delivery of a small quantity of gasoline before the valve of the nozzle has been opened. The pressure in the hose does not drop materially after the nozzle valve is opened and the only time when the hose can fully contract is after the pump has stopped and the pressure in the system has dropped to atmospheric due to the vent provided in the air separator or elsewhere. The usual result then is that there is a small back flow through the meter which, however, does not in prior forms of dispensing apparatus, cause reverse operation of the meter.

This invention has for its general object to provide in liquid dispensing apparatus of the general type described, improvements which are designed to prevent the pointer of the register from jumping ahead prior to the opening of the nozzle valve and giving a false indication that liquid has been delivered.

The invention has for a particular object the provision of means operable during idle periods of the apparatus, to connect the upper part of the visible discharge indicator to a reservoir which contains liquid to a level higher than that of said part and which, at least during idle periods of the apparatus, is vented to the atmosphere. As a result, the air which rises into the visible discharge indicator can escape into the then vented reservoir and be replaced with liquid flowing by gravity from said reservoir into the indicator. The reservoir may be, and preferably is, one of the chambers of the air separator, preferably the pressure chamber thereof.

More particularly, the invention has for an object the provision of an improved control for the connection between the indicator and reservoir, such control comprising a valve, preferably of the spring-loaded, self-closing type, which positively closes said connection at all times except when intentionally opened by the valve actuating means. Such means are interconnected with the manually operated member which actuates the switch in the circuit of the pump motor, in such a way that the valve must be closed prior to the time at which the switch is closed and opened only after the switch is opened, and preferably enough later to prevent any possibility of escape of metered liquid by way of the aforesaid connection from the indicator to the reservoir,—
a very essential and most important condition.
The invention also has for an object the provision of a meter which is reversible and can be moved backward by the back pressure of the liquid caused by the contraction of the hose after the pump has been stopped. There is a lost motion provision somewhere in the driving connections between the displacement element of the meter and the pointer of the register so that the pointer will not be moved backward on backward movement of the meter. These features enable the first forward movement of the meter, caused by the expansion of the hose, to take up the lost motion in said driving connections created by the reverse motion of the meter caused by the contraction of the hose at the end of the preceding dispensing operation, whereby the pointer will not be moved until the nozzle valve is opened.
Other objects will appear as the detailed description proceeds and will be pointed out in the appended claims.
The invention will be disclosed for illustrative purposes with reference to the accompanying drawings, in which:
Fig. 1 is a front elevational view of a meter type liquid dispensing apparatus embodying the invention;
Fig. 2 is a side elevational view thereof with parts broken away to reveal interior construction;
Fig. 3 is a fragmentary view, taken similarly to Fig. 1 but showing the hose nozzle in place on its support;
Fig. 4 is a fragmentary sectional plan view taken on the line 4—4 of Fig. 1;
Fig. 5 is a sectional view taken on the line 5—5 of Fig. 4;
Fig. 6 is a sectional elevational view of the air separator;
Fig. 7 is a sectional plan view thereof taken on the line 7—7 of Fig. 6;
Figs. 8 and 9 are sectional elevational views taken on the lines 8—8 and 9—9, respectively, of Fig. 7;
Figs. 10 and 11 are sectional elevation and cross sectional views, respectively, of the meter;
Fig. 12 is a sectional view taken on the line 12—12 of Fig. 11; and
Fig. 13 is a fragmentary sectional view taken on the line 13—13 of Fig. 7.
Referring to these drawings; there is shown in Figs. 1 and 2, more or less in conventional form, one type of liquid dispensing apparatus in which the invention may be embodied. The apparatus herein shown is intended to serve merely as an illustrative example of one of many types of dispensing apparatus with which the invention may be used. Hence, the details of the apparatus disclosed are not important and may be widely varied as desired.
The apparatus involves a suitable pump, such as the rotary pump 11, or other means for raising liquid from a low level supply tank and forcing it through the delivery conduit to be described. As shown, the pump 11 is connected to a suction pipe 12 which is adapted for connection to the aforesaid supply tank. The delivery conduit through which liquid is forced by pump 11, includes a series of pipes 13, 14 and 15 and a flexible hose 16. The pipe 13 is connected to the outlet of the pump and extends upwardly and is connected to the inlet of an air separator unit 17. The pipe 14 connects the outlet for air-free liquid of the separator to the inlet of a suitable meter 18, herein shown (Figs. 10 and 11) as of the piston or positive displacement type. The pipe 15 connects the outlet of the meter to the inlet of a suitable visible discharge indicator 19, the outlet of which is connected to one end of the flexible hose 16. On the other end of hose 16 is a valved hose nozzle 20 (Fig. 3), the valve stem 21 of which is adapted to be engaged by a lever 22, pivoted to a guard 23 formed integrally with the nozzle. The valve of this nozzle is normally closed but may be opened by moving lever 22 to the left, as viewed in Fig. 3, far enough to engage and move stem 21. The meter 18 is provided with a suitable register, such as that shown in Fig. 1, having a graduated dial 24 over which the indicator hands 25 and 26, both driven by meter 18, travel. The larger hand 25 is so driven that it makes one complete revolution for each unit measured quantity while the other hand indicates by reference to the graduations of dial 24 the number of unit quantities dispensed.

The pump 11, as herein shown, is driven by an electric motor 26 through a belt 27 and pulleys 28. Both motor and pump are mounted on a common plate 29, fixed to columns 30 which extend upwardly from a base 30' and form part of the skeleton frame of the apparatus. The meter 18 and its register are supported from cross bars 31, fixed to other columns 32 upstanding from a member 33, which is supported by the columns 30. The space between the base 30' and member 33 is enclosed by a sheet metal casing 34 and a similar casing 35 encloses the space between the member 33 and a dome 36 which is supported by the columns 32.

The motor 26 is provided with a suitable switch which is housed within the casing 37 and operated by a lever 38 (Fig. 2). When the lever is positioned as shown, the switch is opened. For convenience in operating the switch, a handle 39 is provided outside the casing 35, such handle having a hub 40 fixed to a short horizontal shaft 41 (Fig. 4), mounted in a bracket 42, fixed to one of the cross bars 31. Fixed on the inner end of shaft 41 is a crank 43, the crank pin 44 of which passes through slots formed in two levers 45 and 46 mounted side by side in closely adjacent relation and both pivotally connected by a pin 47 to the bracket 42. Lever 45 is connected by a link 48 to the switch lever 38. When handle 39 is moved to the right from the position shown in Fig. 2, in which the motor switch is open, the crank pin 44 will first engage walls 49 of the slot 50 in lever 45. Such walls are then concentric with shaft 41 and consequently lever 45 will not be lifted. After an initial movement of handle 39 to a predetermined degree in the described direction, the crank pin 44 engages other walls 51 of slot 50, which walls are non-concentric with shaft 41, and the engagement of the pin with such walls forces lever 45 downwardly and causes the motor switch to close.

The slot 52 in lever 46 is similarly but reversely formed. That is, it has non-concentric portions 53 which are engaged by pin 44 on the first movement of handle 39 to the right, and other portions 54 which are engaged by said pin and are disposed concentric with shaft 41 during the time when pin 44 is engaging the walls 51 and forcing lever 45 downwardly. The handle 39 in its movement to the right first moves lever 46 upwardly and then moves lever 45 downwardly and, while performing the latter operation, also holds lever 46 in its raised position. On a return movement of handle 39, the lever 45 is first raised to open the motor switch and then lever 46 is lowered and, while it is being lowered, the lever 45 is maintained in raised position. Thus, the levers are operated successively and the motor switch is closed at the end of the right hand stroke of handle 39 and opened during the first part of its left hand stroke. The lever 46 thus has to be raised before the motor switch can be closed and it cannot be lowered until the motor switch is opened.

The lever 46 operates the valve shown in Fig. 9 which controls the venting and the liquid replenishing means for the visible discharge indicator 19. Lever 46 has pivotally connected thereto a stud 55 through which slidably passes one end of a connecting rod 56, which extends upwardly (Fig. 2) inside the pump casing and is pivotally connected at its upper end to a lever 57 which operates a valve contained in a casing 58 secured to the separator 17. On rod 56, above stud 55 is a washer 59 and passing through the rod at a point above the washer is a pin 60. A similar pin 61 passes through the rod 56 near its lower end and a second washer 62 on rod 56 rests on pin 61. A spring 63 encompassing rod 56 presses at its lower end against washer 62 and at its upper end against a third washer 64 which in turn bears against the lower face of stud 55. The lever 46 is moved downwardly to effect the opening of the valve in casing 58. A dashpot arrangement, to be described, provides for a very slow movement of the valve opening means. Consequently, rod 56 cannot move down quickly. Hence, the spring 63 will be compressed when lever 46 is moved downwardly and will subsequently gradually expand and slowly pull down rod 56.

The valve referred to is shown at 64 in Fig. 9. Its stem 65 is mounted for vertical sliding movement in a cap 66 screwed to the top of casing 58 and a spring 67, acting between this cap and the top face of the valve, tends to move the latter to and hold it in closed position. In this position, the valve closes off communication between the inlet passage 68 and the underlying cylindrical chamber 69 formed in casing 58,—such communication being permitted when the valve is open by way of a central vertical passage 70. An outlet passage 71 leads from the upper part of chamber 69 and is connected by a pipe 72 to the upper part of the indicator 19 (Fig. 1).

The valve 64 is opened by a centrally located pin 73 which is fixed to the upper face of a piston 74 and extends upwardly therefrom. The piston 74 is slidable in cylinder 69 and is movable by the lever 57. This lever is fixed to one end of a shaft 75 which is mounted in casing 58 and extends into a recess 76 leading off from one side of the cylinder 69 (see Fig. 12), where it has fixed thereto a lever 77. The outer end of this lever is forked and engaged in recesses formed in a depending hub 78 on the piston. The skirt of the piston is cut away, where necessary, as shown in Figs. 9 and 12 to clear the lever 77. A seal ring 79 (Fig. 9) pressed by a spring 80 seals the joint where the shaft 75 enters the chamber 76. The piston has a suitable number of openings 81 therethrough which are normally closed by a valve disc 82 urged downwardly by a bowed spring 83, fixed centrally to pin 73 and bearing at its ends on disc 82. Access to cylinder 69 for installation of the piston 74 and lever 77 is had by way of a removable cap 84 which normally closes the lower end of cylinder 69.

In normal operation, the cylinder 69 is entirely filled with liquid, both above and below the piston 74. Consequently, when the lever 57 is pulled downwardly in an attempt to raise the piston, the latter can move only slowly because liquid has to be displaced from the upper to the lower part of cylinder 69 to allow the piston to rise. Leakage between the piston and the wall of cylinder 69 which it engages, is relied on in this case for the purpose of allowing slow upward movement of the piston at a controlled and predetermined speed. A definite time interval is required, after lever 39 has been moved into position to stop the pump motor, before the piston can rise enough for pin 73 to lift valve 64 off its seat. The length of this interval is such that the motor and the pump driven thereby will have time to come fully to rest before valve 64 begins to open. Thus, not only is the motor shut off but it is preferably wholly stopped before valve 64 is opened to allow replenishment of the visible discharge indicator 19. The purpose is to allow the pressure in the system to be reduced to atmospheric by the vent in the air separator to be described, before opening valve 64. If the valve opened sooner, liquid would escape up the replenishing pipe 72 and such liquid which has been measured by the meter 18 would be lost to the customer. Also, one of the important results of the invention, involving the application of back pressure on the meter, could not be effected.

The valve 64, although opening only after the elapse of a predetermined interval from the time of shutting off the motor, nevertheless closes quickly when the motor switch is turned on. When lever 57 is raised, the piston 74 will lower readily enough because the valve disc 82 will rise and allow rapid flow of liquid through holes 81 from the lower to the upper side of piston 74.

The visible discharge indicator is of the general type now customarily used, in which both inlet and outlet are formed in the base member 85 of the glass cylinder 86, the cap member 87 of which is, according to usual prior practice, closed. This arrangement has the disadvantage that air may become trapped in the upper part of the glass cylinder. To enable the escape of air from the upper part of the glass cylinder and the replenishment of the cylinder with liquid, the said part is connected by the described pipe 72 to the passage 71 of the valve shown in Fig. 9. The particular details of construction of the indicator 19 are not important and may be varied widely as desired. As an illustrative example of one of many constructions of visible discharge indicators suitable for the purpose, reference is made to the W. H. De Lancey Patent No. 1,844,212, granted February 9, 1932. Such indicator is so constructed as to remove air from the upper part of the glass cylinder and pass it into the flexible hose 16.

It is common in dispensing apparatus of this type to provide means for ridding the liquid of air and gases which may be trapped therein, before the liquid is allowed to pass to meter 18. For this purpose, the air separator 17 is provided. Its general location is indicated in Figs. 1 and 2 and its internal construction in Figs. 6 to 8. Referring to Figs. 6 and 7, the casing 17 is divided by a partition 88 into a main separating chamber 89 and a trap chamber 90. These two chambers are in constant but restricted communication by means of a passage 91 formed in the removable cap 92 of the separator. The separator chamber 89 is subdivided by a partition 93 to form an inlet chamber 94. The partition 93 extends only part way up in the separator chamber. Liquid pumped up through pipe 13 enters the base of the inlet chamber 94 and rises therein until it reaches the crest 95 of the dam-like partition 93 where it overflows and fills the chamber 89. Liquid leaves the separator by way of a cored passage 96 which communicates with the described outlet pipe 14. In order to reach this passage 96, the liquid has to pass through a cylindrical screen 97 which offers considerable resistance to the passage of air. The air, thus restrained, rises up through the liquid and into the upper part of the chamber 89 where it passes out through the passage 91 into chamber 90. Some liquid will also pass through passage 91 and such liquid will be collected in chamber 90. A cored passage 96' (Fig. 6) provides for constant communication between chamber 89 and the inlet passage 68 in valve casing 58.

The base of the chamber 90 has connected thereto a pipe 98 and pipe 98 (Fig. 1) leads downwardly and is connected to the suction pipe 12. A valve 99 (Fig. 8) controls the communication between chamber 90 and pipe 98, and this valve is opened and closed by the rising and falling of a float 100. If liquid accumulates in chamber 90 above a predetermined level, float 100 rises on its guide rod 101 and lifts the outer end of a lever 102 to which valve 99 is pivotally connected,— opening this valve and allowing the accumulated liquid to pass back to the suction side of the pump until the level of liquid in chamber 90 drops sufficiently to allow valve 99 to close. The guide rod 101 is fixed to a bracket 103 which also supports the post 104 to which lever 102 is pivoted. The passage, which is connected to pipe 98 and is controlled by valve 99, is formed in the lower part of this bracket. The valve has upstanding guide wings 105 which slidably engage the post 104 and an upstanding web 106 on bracket 93, to guide the valve in a straight line toward and away from its seat.

The chamber 90 is vented to the atmosphere at all times under ordinary conditions. Holes 107 in cap 92 place the upper part of the chamber in constant communication with a float chamber 108, which has an outlet 109 leading to the interior of a screen 110, the exterior of which is in open communication with the atmosphere as at 111. The screen is covered by a hood 112. The outlet 109 is controlled by a valve 113 which is fixed to and movable by a float 114 in chamber 108 to close the outlet 109 if and when liquid enters the chamber above a predetermined level. This valve is merely a safety device to guard against escape of gasoline from the apparatus even under the unusual condition where gasoline enters the chamber 108. Normally, this valve would be open as shown, and therefore chamber 90 as well as chamber 89 is constantly vented to the atmosphere. It is not, however, necessarily essential for all purposes that chamber 89 be constantly vented as shown. Some air separators are provided with valves controlling the air vent passage of the separator and maintaining it open only when necessary. The essential requirement here is that chamber 89 be vented during idle periods of the apparatus to enable escape of air from the visible discharge indicator and reduction of the pressure in the pumping system to atmospheric, as already described.

The visible discharge indicator is connected by pipe 72, passage 71, chamber 69 and passage 70 to valve 64 and the passage 68 of that valve is connected by the passage 96' to the chamber 89 of the separator. As shown in Fig. 9, this passage 96' is a cored passage which extends across the inlet chamber 94 and is in constant communication with the chamber 89 near the upper part thereof. It will be clear then that whenever valve 64 is open, air can pass from the visible discharge indicator into chamber 89 and escape by way of the passages 91, 107, 109 and 111 to the atmosphere. It should also be noted that this chamber 89 under normal conditions will be filled with liquid to the level of the crest 95 of the dam 93 and that this level is above the top of the discharge indicator 19, wherefore liquid will flow by gravity from chamber 89 into glass cylinder 86 whenever required in order to replace the air eliminated as above described, provided of course that valve 64 is open. The dam 95 insures that there will always be available sufficient liquid for this purpose, notwithstanding that there may be leakage which will cause the liquid in pipes 12 and 13 to drain back to the supply tank. It is to be noted that the liquid cannot be drained out of chamber 89 by opening the hose nozzle valve while the pump is stopped because the head of liquid available is not sufficient to move the pistons of the meter 18.

It is customary to provide for the locking up of the apparatus and in this case the control handle 39 is interrelated with a hose nozzle support 118 after the general manner disclosed in our prior Patent No. 1,881,754, granted October 11, 1932. When the hose nozzle is in place on this support as shown in Fig. 3, the guard 23 of the nozzle projects beyond the end of the support 118 and into the path of movement of handle 39. This handle cannot then be moved to start the motor or to close the valve 64. Also, before the nozzle can be placed on said support, it is first necessary to shut off the motor and this in due time will cause the opening of valve 64. The nozzle guard 23 and support 118 are adapted to be locked together by a padlock as disclosed in said last named patent. Thus, when the parts are locked up, the valve 64, once it has opened, is positively held open to insure venting of the visible discharge indicator.

While the meter 18 may take any suitable form, it is preferred to use a piston-type, displacement meter and one which can be moved backward by backward flow in the outlet piping after the motor has stopped as well as forwardly by the normal forward flow of liquid which occurs during the dispensing operation. A meter of this type has been shown in part in Figs. 10 and 11. In the casing 18 is an inlet chamber 120 connected to pipe 14, and below such chamber are two cylinders 121 and 121' so disposed in the casing as to allow free communication between the open ends of each and ports 122 formed in the bottom wall of chamber 120. Transverse partitions 123 block off communication between the two ports 122 and form between them an outlet passage 124, in communication with pipe 15. A slide valve 125 reciprocates over the ported part of the bottom wall of chamber 120 and is held to such wall by a spring 126. This valve has a recess 126' effective, when positioned as shown, to connect one port 122 to the outlet passage 124. When the valve is thus positioned, the other port 122 is uncovered so that liquid can enter the right hand end of cylinder 121 and move the piston 127 to the left, forcing liquid in the left hand end of the cylinder to flow through the left hand port 122 into the exhaust passage 124. The valve, when moved to its other extreme position, will reverse the flow and cause the piston 127 to move to the right. The piston drives by a connecting rod 128 a crank 129 fixed on a crankshaft 130. Associated with the other cylinder 121' are parts 122' to 129' inclusive, which are similar to the parts 122 to 129 associated with cylinder 122, except that the crank 129' is arranged at right angles to crank 129. The two cylinders 121 and 121' are, of course, separated by a suitable longitudinal partition and near the crankshaft end by two partitions 131 in which the crankshaft is mounted and between which a compartment is provided for the valve actuating mechanism. Since the mechanisms for the two valves are alike, one only need be described and corresponding parts of the other mechanism will be designated by the same reference numerals primed. A rocker arm 132 pivoted at 133 has a hole 134 (Fig. 12) therein to receive the crankshaft 130 and afford play for the necessary degree of reciprocation of the rocker arm. The upper end of this arm is connected by a link 135 to valve 125. A cylinder cam 136 fixed on shaft 130 cooperates with two rolls 137 to swing the rocker arm back and forth during rotation of the crankshaft.

The indicator hands 25 and 26 are driven from the crankshaft by the usual or any suitable mechanism (not shown), connected with and driven by the universal joint member 138, shown in Fig. 11 as fixed to the upper and protruding end of a vertical shaft 139 mounted in casing 18. The lower end of shaft 139 carries a worm gear 140, driven by a worm 141 fixed on a shaft 142 mounted in casing 18 in alignment with crankshaft 130 but with one end terminating adjacent but axially spaced from an end of the crankshaft. Said end of shaft 142 has fixed thereto a crank 143 with which a pin 144, fixed to crank 129, is adapted to abut for the purpose of driving crank 143. When the crankshaft turns in the direction of the arrow, as it does during the delivery of gasoline to a customer, the pin 144 will abut crank 143 and turn shaft 142 and thereby drive the indicator hands of the register. After the flow of liquid has been shut off at the nozzle 20 and the motor has been stopped, the back pressure of the liquid will drive the pistons of the meter backward and turn crankshaft 130 in a counter-clockwise direction as viewed in Fig. 10. When this occurs, pin 144 simply moves away from crank 143 into the position shown and no movement will be imparted to the indicator hands 25 and 26.

It is to be noted that the meter of this invention is a reversible one. That is, it is so constructed that the slide valves 125 and 125' will not be lifted off their seats by the back pressure of liquid moving up in outlet passage 124 into recess 126' of the valve. The spring 126 is made strong enough to resist lifting of the valve under the pressures normally existing in the system. Many meters of this type are not reversible for the reason that the valves do lift from their seats and defeat reverse movement of the drive shaft of the meter.

The operation of the apparatus will next be described. When the apparatus is idle, there is under normal conditions a space such as is shown in Fig. 1 between the driving pin 144 of the meter and the arm 143 which it drives. This lost motion between these elements was created by backward movement of the pistons of the meter under a backward flow of liquid caused by the contraction of the stretchable hose 16 after the pump has been stopped and the pressure in the pumping system has dropped to atmospheric. It will be understood, of course, that the pressure in the system will thus drop because the chamber 89 of the air separator is vented to the atmosphere. Thus, when the pump is started up, which is done while the valve of nozzle 20 is closed, the first movement of the liquid, which causes the hose to stretch, will move the pistons 127 and 127' and turn shaft 130 in a clockwise direction, as viewed in Fig. 10, until the pin 144 abuts the arm 143. In other words, that volume of liquid which passes the meter to fill up the extra space in the hose created by its elongation under pressure, is effective only to take up the lost motion created in the drive between the meter and register pointers at the end of the preceding dispensing operation by reverse flow of liquid through the reversible meter caused by the contraction of the hose. Ordinarily, the hose will contract after the pump has been stopped to an extent substantially the same as that to which it has elongated. Thus, the pointer of the register will not be moved by that movement of liquid which initially stretches the hose. It should be noted that the hose, when stretched by the building up of liquid pressure in the system prior to the opening of the nozzle valve, does not contract to any appreciable extent when the nozzle valve is opened. There is, it is true, a drop in pressure when such valve is opened but it is too small to allow an appreciable contraction of the hose at that time. Under ordinary conditions, we have found that the hose will elongate enough under the conditions described to cause several cubic inches of liquid to pass through the meter before the nozzle valve is opened. With prior gasoline dispensing apparatus of the meter type this quantity, say for example three cubic inches, would be registered by the large pointer 25. The customer would see a sudden jumping of this pointer away from the zero mark prior to the opening of the nozzle valve and naturally he would complain. With the present arrangement, this volume of three cubic inches would be passed out of the meter without showing on the register and at the end of the dispensing operation substantially the same volume would be passed back into the meter without moving the register. The customer obviously will get the full quantity indicated on the register.

The other cause for the pointer of the register to jump ahead and give the false indication of liquid delivery is the presence of air or gases in the visible discharge indicator 19. Such air or gases, if present, will be compressed when the pump is started up with the nozzle valve closed and the result will be an additional movement of the pointer 25 of the register. To overcome trouble from this source, the venting and replenishing means, above described, have been provided to the end that during idle periods of the apparatus the air or gases in the upper part of the indicator 19 may rise through pipe 72 into a vented compartment of the air separator and be replaced by liquid flowing by gravity from such compartment.

In operation, the operator removes nozzle 20 from its support 118 and moves handle 39 to the right from the position shown by full lines in Fig. 2 to that shown by dotted lines. The first result of this movement of handle 39 is the closing of the valve 64 in the connection between the upper part of the discharge indicator 19 and the chamber 89 of the air separator 17. This one possible path for diverting liquid which has been measured by the meter, from the delivery hose 16 is thus closed and, moreover, it is closed in a substantially fool proof manner. The operator cannot, by any easily accomplished manipulation, cause an opening of valve 64 without first opening the motor switch. Having closed this valve and thereafter having closed the motor switch, gasoline is dispensed in the usual way. The liquid is pumped into separator chamber 89 and there freed of air and gases insofar as possbible, and the air-freed liquid is forced through the meter 18, the discharge indicator 19 and hose 16 into the tank of the customer's car. As soon as the desired quantity of gasoline has been dispensed, the operator closes the hose nozzle valve, moves handle 39 back into the full line position shown in Fig. 2 and places the nozzle on support 118. The first part of such movement of handle 39 opens the motor switch and after the elapse of a predetermined interval the motor and pump will stop. Until these elements do stop the pressure of liquid will be maintained and such pressure cannot drop to atmospheric, as desired. The last part of the movement of handle 39 places under stress the valve opening means but, as already described, the valve 64 will not open until a predetermined interval has elapsed. The length of this interval is such as to allow ample time for the pump to come to rest and for the pressure in the system to drop to atmospheric. If the valve 64 opened at an earlier time, the back flow of liquid which is relied on to turn the meter backward, would be diverted at least in part through pipe 72 and could not be wholly utilized as desired, to cause the meter to be moved back as far as is necessary and desired when the hose contracts. The delayed closing of valve 64 is therefore of great importance where the feature involving reverse operation of the meter is used. If such feature is not used, there would not of course, be the same necessity for slow closing of this valve.

When valve 64 is opened, the upper part of the visible discharge indicator is placed in communication with chamber 89 of the air separator. Thus, any air which may perhaps rise, bubble by bubble from time to time, into the discharge indicator will be enabled to pass through the described connection into chamber 89 and thence to the atmosphere. Also, liquid from such chamber can flow into the indicator 19 to replace such air as escapes therefrom. An important characteristic of the apparatus is that the valve which controls the venting and replenishment of the discharge indicator, must be positively closed before the motor can be started. To delay the closing of this valve until the motor is started, makes it possible for some liquid, which has been measured by the meter, to be diverted back into the air separator and away from the customer who is paying for it. With the present arrangement, the valve is closed during the preliminary part of the act necessary to start the motor and the valve must be entirely closed before the motor can be started.

The invention fills a very important need. Notwithstanding the fact that an air separator is used in an endeavor to remove from the gasoline before it enters the meter 19, as much air or entrained gases as possible, some air does under some conditions find its way past the separator. Such separators are not always perfect in their operation and in the event of a bad air leak in the suction line, they may not have sufficient capacity to remove from the gasoline all the air that is drawn into the delivery conduit. Notwithstanding also that the visible discharge indicator 19 may also have provisions, such as disclosed in the above identified De Lancey patent, for eliminating air from the top of the glass cylinder 86, this does not always cure the trouble because such air as is eliminated by such provisions is passed into the hose 16 and may, to some extent at least, be retained in the spiral convolutions of the metal lining of the hose. After the apparatus has stopped, some of this air in the form of small bubbles may work its way upwardly in the hose and into the indicator 19. If the hose is shaken, bubbles may be seen to rise up through the glass cylinder. So, in spite of all known precautions, air can and often does collect in the upper part of the glass cylinder 86. The presence of air in the indicator 19 arouses the customer's suspicions in any event. However, a worse difficulty is that the air, trapped in the upper part of cylinder 86, is compressed the moment that the pump starts and there is a sudden movement of the indicator hand 25 away from zero position. For example, if the valve of hose nozzle 20 is closed so that no liquid can escape, the customer will see the hand 25 move and necessarily he objects to the indication by this hand on the register that liquid has been dispensed when in fact it hasn't. The described provisions insure that the air has a chance to escape from the glass cylinder 86 during the inactive periods of the apparatus and that such cylinder is maintained at all times filled with liquid.

The more important cause of the false indication of pointer 25 which occurs on starting up the apparatus, is the elongation of the flexible hose. This trouble has been overcome effectively by the use of a reversible meter with a lost motion provision of any suitable kind, whether those described or others, at some suitable point in the driving connections, whether at the point described or elsewhere, between the meter and the register.

It will be obvious that either feature may be used independently of the other although the use of both is generally desired. Both features, viz, that relating to the prevention of air accumulations in indicator 19 and that relating to counteracting the effect of elongation of the hose, have the same broad object, viz, the prevention of the sudden initial jump of pointer 25 away from zero position when the pump is started up with the nozzle closed.

The invention has been disclosed herein, in an embodiment at present preferred, for illustrative purposes but the scope of the invention is defined by the appended claims rather than by the foregoing description.

What we claim is:

1. A liquid dispensing apparatus, comprising, a delivery conduit, means for forcing liquid therethrough, a meter interposed in said conduit, a container interposed in said conduit on the outlet side of the meter and having a transparent wall through which the flow of liquid through the container may be observed, a reservoir interposed in said conduit and vented to the atmosphere at least during the intervals when no liquid flows in said conduit, said reservoir arranged to trap liquid therein to a predetermined level and located at an elevation such that the level of the liquid retained therein is above the upper part of said container, a connection between the upper part of said container and the reservoir for the flow of liquid from the reservoir to the container and for the flow of accumulated air and gases in the container from the latter to the vented reservoir, a valve to open and close said connection to permit and prevent, respectively, flow therethrough, a device to stop and start said liquid forcing means, and a common means for actuating in sequence said valve and device, positively closing said valve before said device is moved into position to start said liquid forcing means and opening it only after said device has been moved into position to stop said liquid forcing means.

2. A liquid dispensing apparatus, comprising, a delivery conduit, an electric motor operated pump for forcing liquid therethrough, a switch for stopping and starting the pump motor, manually operable means for opening and closing said switch, a meter interposed in said conduit, a container interposed in said conduit on the outlet side of the meter and having a transparent wall through which the flow of liquid through the container may be observed, an air separator interposed in said conduit on the inlet side of the meter and located above the same, said separator having a chamber which is vented to the atmosphere when the pump is not in operation and said chamber adapted to contain liquid to a level above that of the upper part of said container, a conduit connecting said chamber and part for the flow of liquid from the chamber to the container, a valve to open and close said last named conduit to permit and prevent, respectively, flow therethrough, and operating connections between said valve and said manually operable means whereby the valve will be positively closed before the switch is closed and opened only after the switch has been opened.

3. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter with its upper part above the meter and below said level, said container having a transparent wall through which the flow of liquid through the container may be observed, a conduit connecting said reservoir to said container for the gravity flow of liquid from the reservoir to the container, a valve to open and close said second conduit and permit and prevent, respectively, flow therethrough, means to force liquid through the first named conduit and the reservoir, meter and container interposed therein; a device to control the flow through said first named conduit, and a single manually operable lever for actuating said device and valve to close the valve before said device is moved to permit flow through the delivery conduit and to open said valve only after said device has been moved to stop said flow.

4. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter, with its upper part above the meter and below said level, said container having a transparent wall through which the flow of liquid through the container may be observed, a conduit connecting said reservoir to the said container for the gravity flow of liquid from the reservoir to the container, a valve to open and close said second conduit and permit and prevent, respectively, flow therethrough, power-operated pumping means to force liquid through the first named conduit and the reservoir, meter and container interposed therein; a device to start and stop said means, and a common lever for successively actuating said device and valve, closing the valve before said device is moved to start said means and moving said device to stop said means before said valve is opened.

5. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter with its upper part above the meter and below said level, said container having a transparent wall through which the flow of liquid through the container may be observed, a conduit connecting said reservoir to said container for the gravity flow of liquid from the reservoir to the container, a valve to open and close said second conduit, and permit and prevent, respectively, flow therethrough, power-operated means to force liquid through the first named conduit and the reservoir, meter and container interposed therein; a device to control the starting and stopping of said power-operated means, and means for actuating said device and valve operable to close said valve before said device is moved to start said power-operated means and operable to open said valve only after a predetermined interval has elapsed from the time when said device is moved into position to initiate the stopping of said power-operated means, said interval being at least as long as that required for the power-operated means to come to rest after said device has been moved into the last named position.

6. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter with its upper part above the meter and below said level, said container having a transparent wall through which the flow of liquid through the container may be observed, a conduit connecting said reservoir to said container for the gravity flow of liquid from the reservoir to the container, a valve in said second conduit, power-operated means to force liquid through the first named conduit and the reservoir, meter and container interposed therein; a device to initiate the starting and stopping of said power-operated means, quick-acting means for closing said valve and slow-acting means for opening it, and a member for coordinating the operation of said device and said valve actuating means, said member operable to set said quick-acting means into action to close the valve and then move said device to initiate the starting of said power-operated means and also operable to move said device to initiate the stopping of said power-operated means and to initiate the action of said slow-acting means and cause said valve to open only after said power-operated means has stopped.

7. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter with its upper part above the meter and below said level said container having a transparent wall through which the flow of liquid through the container may be observed, a conduit connecting said reservoir to said casing for the gravity flow of liquid from the reservoir to the casing, a valve to open and close said second conduit and permit and prevent, respectively, flow therethrough, an electric motor driven pump to force liquid through said first named conduit and the reservoir meter and container interposed therein; a switch to control the motor, a control member operable to cause the closing of said valve and then the closing of said switch and also operable to open said switch and then cause the opening of said valve, and means for retarding the opening of said valve long enough after the opening of said switch to allow said motor driven pump to stop.

8. A liquid dispensing apparatus, comprising, a delivery conduit, a meter interposed therein, a flexible hose anchored at one end to the delivery end of said conduit, a nozzle on the other end of said hose having a normally closed valve, means for forcing liquid through said conduit, meter, hose and nozzle under substantial pressure, said pressure acting on the nozzle and causing elongation of the hose when said forcing means is started up with said valve closed, venting means operable when the forcing means is stopped to reduce to atmospheric the pressure in said conduit, whereby the hose contracts to substantially the same extent that it elongates, said meter having an element positively movable by flow of liquid in either direction through said conduit, whereby it will be moved in one direction to a limited degree when pressure is built up in the conduit and the hose elongates and whereby it will be moved in the opposite direction to substantially the same degree when the pressure in the conduit is relieved and the hose contracts, a movable element driven from said displacement element for indicating the quantities of liquid dispensed, and means for preventing those movements of the displacement element caused by expansion and contraction of the hose from moving the indicating element.

9. A liquid dispensing apparatus, comprising, a delivery conduit including as a terminal portion a flexible hose having at its delivery end a valved nozzle, a meter interposed in said conduit and operable by the normal forward flow of liquid in said conduit or by reverse flow, intermittently operable means for forcing liquid through said conduit under substantial pressure, venting means operable when the forcing means is not in operation to reduce the pressure in said conduit to atmospheric, said hose elongating when pressure is created in said conduit before said valve is opened and contracting when said pressure is reduced after said valve is closed, whereby the meter is moved to a limited extent in one direction before liquid is delivered from the nozzle and moved back by substantially the same extent after delivery of liquid from the nozzle has ceased, a movable element for indicating the quantities of liquid dispensed, and driving connections between said element and meter including provision for lost motion to prevent the movements of the meter caused by expansion and contraction of the hose from operating said element.

10. A liquid dispensing apparatus, comprising, a delivery conduit, a meter interposed in said conduit, a reservoir also interposed in said conduit on the intake side of said meter and vented to the atmosphere at least at times when no liquid flows in said conduit, said reservoir arranged to trap liquid therein to a predetermined level, said reservoir located at a higher elevation than the meter, a container interposed in said conduit on the outlet side of said meter with its upper part above the meter and below said level said container having a transparent wall through which the flow of liquid through the container may be observed, a conduit connecting said reservoir to said container for the gravity flow of liquid from the reservoir to the container, a valve to open and close said second conduit and permit and prevent, respectively, flow therethrough, an electric motor driven pump to force liquid through said first named conduit and the reservoir, meter and container interposed therein; a switch movable to start and stop said motor, resilient means tending to move said valve to and hold it in closed position, an actuating member for said valve movable in one direction to open said valve and in another direction to allow said valve to be closed by said resilient means, dashpot means for retarding the movement of said member in the first named direction, and a control lever connected to operate said switch and member in sequence and cause said valve to close prior to the closing of said switch and to initiate the valve-opening movement of said member before said switch is opened, the connection between said lever and member including resilient means yieldable to allow full movement of the lever when moved to initiate opening of the valve and subsequently operable to move the member as fast as said dashpot means will permit to open the valve.

11. Liquid dispensing apparatus, comprising, a delivery conduit including a flexible hose terminating with a valved hose nozzle, a meter interposed in said conduit and including a displacement element positively driven by the flow of liquid through said conduit both by the normal forward flow for dispensing purposes and by backward flow, means for forcing liquid in a forward flow under substantial pressure through said conduit, meter, hose and nozzle to thereby drive said element of the meter; venting means operable to cause reduction of the pressure in said conduit to atmospheric when said forcing means is stopped, a register for indicating the quantities of liquid dispensed and including a movable element, driving connections between said movable element and displacement element, said hose being stretchable by pressure of the liquid therein when said forcing means is started up with the valve of said nozzle closed, whereby a certain volume of liquid will pass the meter and move its displacement element but will not pass out of said nozzle, said driving connections including provision for lost motion to a degree such that the movement of the displacement element by said initial volume of liquid will not be effective to actuate the movable element of said register but will simply take up the lost motion, said hose contracting when the forcing means is stopped and causing a backward flow of liquid in volume substantially equal to said volume and such backward flow operable to move the displacement member backward and re-create the lost motion condition in said driving connections.

12. A liquid dispensing apparatus, comprising, a delivery conduit including as a terminal portion a flexible hose having at its delivery end a valved nozzle, a visible discharge indicator interposed between the hose and conduit, a meter interposed in said conduit and operable by the normal forward flow of liquid in said conduit or by reverse flow, a reservoir interposed in said conduit between the meter and indicator and above the same and vented to the atmosphere when the apparatus is idle, a pipe connecting said indicator and reservoir for the gravity flow of liquid from the reservoir to the indicator, a valve to open and close said pipe and permit and prevent, respectively, flow therethrough, power-operated means to force liquid under substantial pressure through said conduit, meter, reservoir, indicator and hose; means operable to close the last named valve and then start said means and also operable to stop said means and to open said valve after the pressure in said conduit has been reduced to atmospheric, said hose elongating when pressure is created in said conduit before said valve is opened and contracting when said pressure is reduced after said valve is closed, whereby the meter is moved to a limited extent in one direction before liquid is delivered from the nozzle and moved back by substantially the same extent after delivery of liquid from the nozzle has ceased, a movable element for indicating the quantities of liquid dispensed, and driving connections between said element and meter including provision for lost motion to prevent the movements of the meter caused by expansion and contraction of the hose from operating said element.

13. A liquid dispensing apparatus, comprising, a delivery conduit, a meter interposed therein, a visible discharge indicator interposed in said conduit on the outlet side of said meter, a reservoir interposed in said conduit and vented to the atmosphere at least at times when no liquid flows in said conduit, said reservoir arranged to trap liquid therein up to a predetermined level and so located that such level is above the upper part of said indicator, conduit means for the flow of air and gases from the upper part of said indicator and for the flow of liquid from said reservoir to the indicator to replace the escaped gases, valve means operable to prevent or permit flow through said conduit means, means to force liquid through said delivery conduit and the reservoir, meter and indicator interposed therein; a device to control the flow through the delivery conduit, and operating connections between said device and valve means for moving the valve means to prevent flow through said conduit means before said device is moved to permit flow through said delivery conduit and for moving said valve means to permit flow through said conduit means only after said device has been moved to stop flow through the delivery conduit, whereby in the intervals between successive dispensing operations any air and gases accumulated in the indicator can escape and be replaced with liquid from said reservoir.

JOSEPH A. LOGAN.
WARREN H. DE LANCEY.